United States Patent
Shahana et al.

(10) Patent No.: US 10,882,582 B2
(45) Date of Patent: Jan. 5, 2021

(54) SUSPENSION CONTROL DEVICE FOR A HUMAN-POWERED VEHICLE

(71) Applicant: Shimano Inc., Osaka (JP)

(72) Inventors: Satoshi Shahana, Osaka (JP); Nobukatsu Hara, Osaka (JP); Hitoshi Takayama, Osaka (JP)

(73) Assignee: Shimano Inc., Osaka (JP)

( * ) Notice: Subject to any disclaimer, the term of this patent is extended or adjusted under 35 U.S.C. 154(b) by 34 days.

(21) Appl. No.: 16/035,078

(22) Filed: Jul. 13, 2018

(65) Prior Publication Data
US 2020/0017163 A1  Jan. 16, 2020

(51) Int. Cl.
*B62K 25/04* (2006.01)
*B62J 45/40* (2020.01)

(52) U.S. Cl.
CPC ............... *B62K 25/04* (2013.01); *B62J 45/40* (2020.02); *B62K 2025/044* (2013.01)

(58) Field of Classification Search
CPC ............... B62K 25/04; B62K 2207/00; B62K 2025/044
See application file for complete search history.

(56) References Cited

U.S. PATENT DOCUMENTS

| | | | |
|---|---|---|---|
| 6,336,648 B1 | 1/2002 | Bohn | |
| 8,251,376 B2 | 8/2012 | Mouri et al. | |
| 8,317,171 B2 | 11/2012 | Inoue | |
| 8,936,139 B2 | 1/2015 | Galasso et al. | |
| 9,523,406 B2 | 12/2016 | Galasso et al. | |
| 2010/0327542 A1* | 12/2010 | Hara | B62J 99/00 280/5.503 |
| 2011/0202236 A1 | 8/2011 | Galasso et al. | |
| 2014/0035256 A1* | 2/2014 | Zubieta Andueza | B62K 25/08 280/284 |
| 2015/0197308 A1* | 7/2015 | Butora | B62K 25/10 280/283 |
| 2018/0141543 A1* | 5/2018 | Krosschell | B60W 30/02 |
| 2018/0370593 A1* | 12/2018 | Park | B62M 6/60 |

FOREIGN PATENT DOCUMENTS

| | | |
|---|---|---|
| CN | 104743038 A | 7/2015 |
| CN | 106794736 A | 5/2017 |
| JP | 7-69031 A | 3/1995 |

OTHER PUBLICATIONS

Fox Suspension Literature, Available prior Jul. 2018.

* cited by examiner

*Primary Examiner* — Abby Y Lin
*Assistant Examiner* — Renee LaRose
(74) *Attorney, Agent, or Firm* — Global IP Counselors, LLP (57) ABSTRACT

A suspension control device is provided for a human-powered vehicle. The suspension control device includes a sensor and an electronic controller. The sensor is configured to detect an actuation of a braking system of the human-powered vehicle. The electronic controller is configured to control a suspension of the human-powered vehicle in accordance with the actuation detected by the sensor.

17 Claims, 6 Drawing Sheets

SUSPENSION CONTROL DEVICE FOR A HUMAN-POWERED VEHICLE

BACKGROUND

Field of the Invention

The present invention generally relates to a suspension control device for a human-powered vehicle.

Background Information

Some human-powered vehicles, in particular bicycles, have been provided with one or more suspensions to absorb the shock that would have been transmitted to the rider when riding on rough surfaces. In recent years, suspension control devices have been proposed to control a state of the suspension(s) based on an operating state of the bicycle.

SUMMARY

Generally, the present disclosure is directed to various features of a suspension control device for a human-powered vehicle. Human-powered vehicle vehicles as used here in refers to vehicles regardless of the number of their wheels, that are power by a human and not by a motor or engine.

In one feature, a suspension control device is provided that selectively controls a suspension of a human-powered vehicle in accordance with information relating to actuation of a braking system of the human-powered vehicle.

In view of the state of the known technology and in accordance with a first aspect of the present disclosure, a suspension control device is provided for a human-powered vehicle. The suspension control device basically comprises a sensor and an electronic controller. The sensor is configured to detect an actuation of a braking system of the human-powered vehicle. The electronic controller is configured to control a suspension of the human-powered vehicle in accordance with the actuation detected by the sensor. With the suspension control device according to the first aspect, it is possible to improve the running performance (e.g., stability) of a human-powered vehicle by controlling a suspension in accordance with an actuation of a braking system.

In accordance with a second aspect of the present disclosure, the suspension control device according to the first aspect is configured so that the electronic controller is configured to control at least one of a damping force, a spring force, a lockout state or a stroke of the suspension. With the suspension control device according to the second aspect, it is possible to improve the running performance of the human-powered vehicle by appropriately controlling the suspension in accordance with the actuation of a braking system.

In accordance with a third aspect of the present disclosure, the suspension control device according to the first or second aspect is configured so that the braking system includes a brake operating device and a braking device. The sensor is configured to detect an information relating to at least one of an actuation of the brake operating device or an actuation of the braking device as the actuation of the braking system. With the suspension control device according to the third aspect, it is possible to easily detect actuation of a braking system.

In accordance with a fourth aspect of the present disclosure, the suspension control device according to the third aspect is configured so that the brake operating device includes a front brake operating device. The braking device includes a front braking device configured to be operated by the front brake operating device. The information relates to at least one of an actuation of the front brake operating device or an actuation of the front braking device. With the suspension control device according to the fourth aspect, it is possible to appropriately control the suspension when a braking force is applied to the front wheel.

In accordance with a fifth aspect of the present disclosure, the suspension control device according to the fourth aspect is configured so that the suspension includes a front suspension. The information relates to the actuation of the front brake operating device. The electronic controller is configured to control the front suspension in accordance with the information. With the suspension control device according to the fifth aspect, it is possible to appropriately control the front suspension when a braking force is applied to the front wheel.

In accordance with a sixth aspect of the present disclosure, the suspension control device according to the fourth aspect is configured so that the suspension includes a front suspension. The information relates to the actuation of the front braking device. The electronic controller is configured to control the front suspension in accordance with the information. With the suspension control device according to the sixth aspect, it is possible to appropriately control the front suspension based on the actuation of the front braking device.

In accordance with a seventh aspect of the present disclosure, the suspension control device according to the fifth or sixth aspect is configured so that the lockout state includes a lockout ON state and a lockout OFF state. The electronic controller is configured to set the front suspension into the lockout ON state in accordance with the information. With the suspension control device according to the seventh aspect, it is possible to appropriately control a lockout state of the front suspension.

In accordance with an eighth aspect of the present disclosure, the suspension control device according to the fourth aspect is configured so that the suspension includes a rear suspension. The information relates to the actuation of the front brake operating device. The electronic controller is configured to control the rear suspension in accordance with the information. With the suspension control device according to the eighth aspect, it is possible to appropriately control the rear suspension when a braking force is applied to the front wheel.

In accordance with a ninth aspect of the present disclosure, the suspension control device according to the fourth aspect is configured so that the suspension includes a rear suspension. The information relates to the actuation of the front braking device. The electronic controller is configured to control the rear suspension in accordance with the information. With the suspension control device according to the ninth aspect, it is possible to appropriately control the rear suspension based on the actuation of the front braking device.

In accordance with a tenth aspect of the present disclosure, the suspension control device according to the eighth or ninth aspects is configured so that the electronic controller is configured to decrease a stroke of the rear suspension in accordance with the information relating to the actuation. With the suspension control device according to the tenth aspect, it is possible to appropriately control the stroke of the rear suspension based on the actuation of the front braking device.

In accordance with an eleventh aspect of the present disclosure, the suspension control device according to the third aspect is configured so that the brake operating device includes a rear brake operating device. The braking device includes a rear braking device configured to be operated by the rear brake operating device. The information relates to at least one of an actuation of the rear brake operating device or an actuation of the rear braking device. With the suspension control device according to the eleventh aspect, it is possible to appropriately control the suspension based on the actuation of at least one of the rear brake operating device or the rear braking device.

In accordance with a twelfth aspect of the present disclosure, the suspension control device according to the eleventh aspect is configured so that the suspension includes a front suspension and a rear suspension. The information relates to the actuation of the rear brake operating device. The electronic controller is configured to control the front suspension and the rear suspension in accordance with the information relating to the actuation of the rear brake operating device. With the suspension control device according to the twelfth aspect, it is possible to appropriately control the front suspension and the rear suspension based on the actuation of the rear brake operating device.

In accordance with a thirteenth aspect of the present disclosure, the suspension control device according to the eleventh aspect is configured so that the suspension at least includes a front suspension and a rear suspension. The information relates to the actuation of the rear braking device. The electronic controller is configured to control the front suspension and rear suspension in accordance with the information relating to the actuation of the rear braking device. With the suspension control device according to the thirteenth aspect, it is possible to appropriately control the front suspension and the rear suspension based on the actuation of the rear braking device.

In accordance with a fourteenth aspect of the present disclosure, the suspension control device according to the twelfth or thirteenth aspect is configured so that the electronic controller is configured to increase the stroke of the front suspension and to decrease a stroke of the rear suspension in accordance with the information. With the suspension control device according to the fourteenth aspect, it is possible to appropriately control the stroke of the front and rear suspensions based on the actuation of the rear brake operating device.

In accordance with a fifteenth aspect of the present disclosure, the suspension control device according to any one of the third to fourteenth aspects is configured so that the electronic controller is configured to adjust a control amount of the suspension in accordance with at least one of an actuation amount of the brake operating device or an actuation amount of the braking device. With the suspension control device according to the fifteenth aspect, it is possible to appropriately control the suspension based on at least one of an actuation amount of the brake operating device or an actuation amount of the braking device.

In accordance with a sixteenth aspect of the present disclosure, the suspension control device according to any one of the one to thirteenth aspects further comprises an additional sensor configured to detect an additional information that relates to traveling inclination of the human-powered vehicle. The electronic controller is configured to control the suspension in accordance to the information and the additional information. With the suspension control device according to the sixteenth aspect, it is possible to appropriately control the suspension based on the traveling inclination of the human-powered vehicle.

In accordance with a seventeenth aspect of the present disclosure, the suspension control device according to any one of the third to sixteenth aspects is configured so that the sensor is mounted at least one of the brake operating device or the braking device. With the suspension control device according to the seventeenth aspect, it is possible to easily detect the actuation of a braking system.

Also, other objects, features, aspects and advantages of the disclosed suspension control device will become apparent to those skilled in the art from the following detailed description, which, taken in conjunction with the annexed drawings, discloses preferred embodiments of the suspension control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle (e.g., bicycle) field from this disclosure that the following descriptions of the embodiments are provided for illustration only and not for the purpose of limiting the invention as defined by the appended claims and their equivalents.

Figure 1:
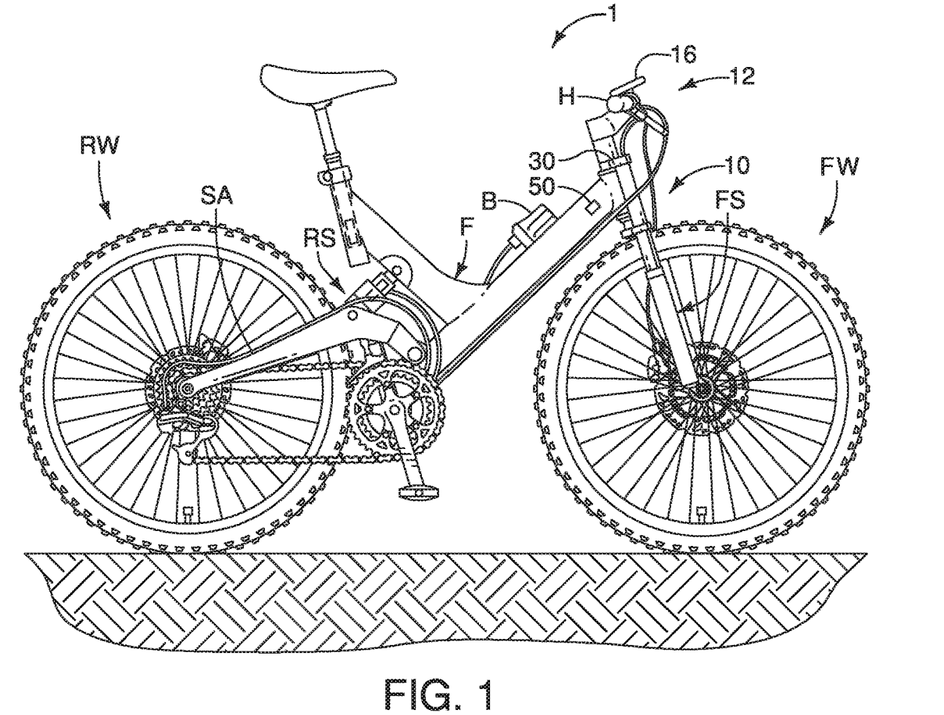
FIG. 1 is a side elevational view of a human-powered vehicle (e.g., a bicycle) having a front suspension and a rear suspension that are controlled by a suspension control device in accordance with one embodiment.
Figure 2:
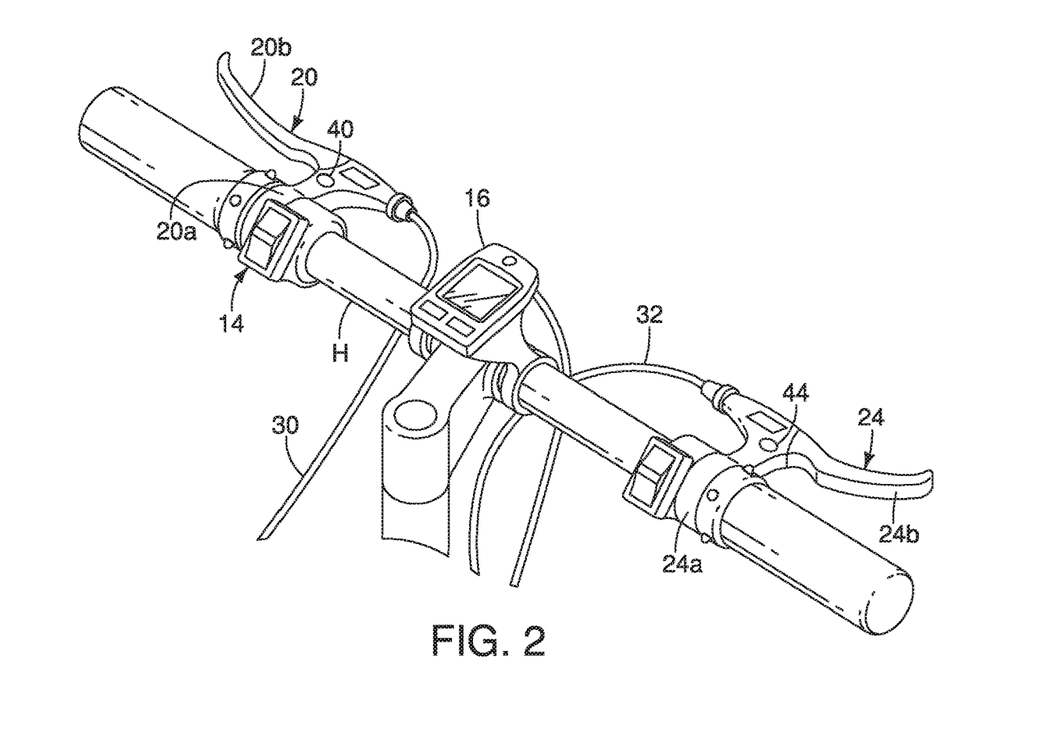
FIG. 2 is a perspective view of a handlebar area of the human-powered vehicle illustrated in FIG. 1.

Referring initially to FIGS. 1 and 2, a human-powered vehicle 1 is illustrated that is equipped with a human-powered vehicle (e.g., a bicycle) suspension assembly 10 that includes a suspension control device 12 in accordance with one embodiment. As seen in FIG. 1, the suspension control device 12 is for the human-powered vehicle 1. While the human-powered vehicle 1 is illustrated as a bicycle, it will be apparent that the suspension control device 12 can be used with other human-powered vehicles that include a suspension. The suspension includes a front suspension FS. The suspension includes a rear suspension RS. Preferably, the suspension includes the front suspension FS and the rear suspension RS. Accordingly, as seen in FIG. 1, the human-powered vehicle (e.g., a bicycle) suspension assembly 10 basically comprises the front suspension FS, the rear suspension RS and the suspension control device 12. The human-powered vehicle (e.g., a bicycle) suspension assembly 10 further comprises a power supply B. The power supply B is attached to a down tube of the main frame F. The power supply B provides electrical power to the front suspension FS, the rear suspension RS and the suspension control device 12.

As seen in FIG. 1, the human-powered vehicle 1 includes a bicycle body having a main frame F, a front suspension FS and a swing arm SA. The front suspension FS is a front suspension fork that is pivotally mounted to a head tube of the main frame F. A front wheel FW is rotatably mounted to a lower end of the front suspension FS. The swing arm SA is pivotally coupled to a rear section of the main frame F. A rear suspension RS is mounted is provided between the main frame F and the swing arm SA. A rear wheel RW is rotatably mounted to a rear end of the swing arm SA. The front wheel FW includes a front hub, a plurality of front spokes, a front rim and a front tire. The rear wheel RW includes a rear hub, a plurality of rear spokes, a rear rim and a rear tire.

The vehicle suspension assembly 10 further includes at least one user input device 14 for manually controlling and/or setting the front suspension FS and the rear suspension RS of the suspension control device 12. The user operable input device(s) 14 is not limited to FIG. 2, and can include, for example, a button, a switch, a lever, a dial and/or a touch screen. The user operable input device(s) 14 can be mounted on a suitable portion of the human-powered vehicle 1. Here, the user operable input device 14 is mounted on a handlebar H of the human-powered vehicle 1. The suspension control device 12 comprises an electronic controller 16. Also, the suspension control device 12 further comprises a sensor. The sensor is configured to detect an actuation of a braking system of the human-powered vehicle 1. Thus, the suspension control device 12 basically comprises a sensor and an electronic controller. As explained below, the suspension control device 12 can use one or more sensors is configured to detect an actuation of a braking system of the human-powered vehicle 1.

In any case, the electronic controller 16 is programmed to automatically control the front suspension FS and/or the rear suspension RS in response to actuation of a braking system of the human-powered vehicle 1. In addition to the automatic control of the front suspension FS and/or the rear suspension RS by the electronic controller 16, the user can preferably manually control of the front suspension FS and/or the rear suspension RS using the user operable input device 14. Accordingly, the electronic controller 16 is configured to control at least one of a damping force, a spring force, a lockout state or a stroke of the suspension (the front suspension FS and/or the rear suspension RS).

The user operable input device 14 is operatively connected to the electronic controller 16. Here, the electronic controller 16 is a part of a cycle computer that can include other conventional functions as needed and/or desired. Alternatively, the electronic controller 16 can be dedicated to controlling and/or setting the front suspension FS and/or the rear suspension RS.

The electronic controller 16 can be programmed to control one of the front and rear suspensions FS and RS, or can be programmed to control both of the front and rear suspensions FS and RS, as explained below. The electronic controller 16 includes one or more processors (hardware) 16a and a memory device 16b (hardware). The processor 16a includes, for example, a central processing unit (CPU) or a micro-processing unit (MPU).

The memory device 16b stores control programs, data, settings, detection results, etc. The memory device 16b is any computer storage device or any computer readable medium with the sole exception of a transitory, propagating signal. The memory device 16b includes a non-volatile memory such as a RAM (Random Access Memory) device, a hard disk, a flash drive, etc. The processor 16a executes the control programs stored in the memory device 16b for controlling one of the front and rear suspensions FS and RS, or both of the front and rear suspensions FS and RS, as explained below.

Here, in the illustrated embodiment, the electronic controller 16 is electrically connected to the user operable input device 14 and the front and rear suspensions FS and RS. Here, the electronic controller 16 includes a communicator 16c that includes a Power Line Communication (PLC) circuit for communicating using a voltage line the supplies electrical power from the power supply B to the electrical components such as the actuators or motors of the front and rear suspensions FS and RS. Alternatively, dedicated signal lines can be provided to transmit control signals from the communicator 16c of the electronic controller 16 to the front and rear suspensions FS and RS. Also, for example, the communicator 16c includes a wireless receiver having a wireless communication circuit for wirelessly communicating with the various sensors. In other words, in the illustrated embodiment, the communicator 16c is configured to communicate with the front and rear suspensions FS and RS through wired connections, and is configured to communicate with the sensors using wireless communication. The wireless communication standard used by the suspension control device 12 can be, for example, ANT+® or Bluetooth®. Accordingly, the communicator 16c includes wired and wireless communication circuits that performs wired and wireless communications.

In the illustrated embodiment, the processor(s) 16a, the memory device(s) 16b and the communicator 16c are circuit on one or more semiconductor chips. The semiconductor chips are mounted on a printed circuit board that is included in the electronic controller 16. In the illustrated embodiment, the electronic controller 16 is a semiconductor chip, and the processor(s) 16a, the memory device(s) 16b and the communicator 16c are modules included in the semiconductor chip. The processor(s) 16a, the memory device(s) 16b and the communicator 16c are electrically connected via a bus. A user can access the electronic controller 16 using an external input device to transmit signals to the electronic controller 16 for updating and deleting information stored in the memory device(s) 16b and for adding information to the memory device(s) 16b. The electronic controller 16 performs a process of a computer program stored in the memory device(s) 16b in accordance with a signal received from one or more external input devices. For example, the external input devices can be a laptop, a smartphone, a tablet terminal, and/or a cycle computer. Thus, the electronic controller 16 and the input devices can communicate either through wires or wirelessly.

The user operable input device 14 is configured to output control signals to the electronic controller 16 for manually controlling and/or setting the front suspension FS and the rear suspension RS of the suspension control device 12. For example, as shown in the illustrated embodiment, the user operable input device 14 can be operated in three ways to control and/or set the front suspension FS and the rear suspension RS. In particular, the user operable input device 14 can be pushed towards the handlebar H to changes modes of operation which can appear on a display screen of the electronic controller 16. The user operable input device 14 can be also be pushed in a forward direction and a rearward direction to adjust (e.g., increase or decrease) a setting in each of the modes.

Figure 3:
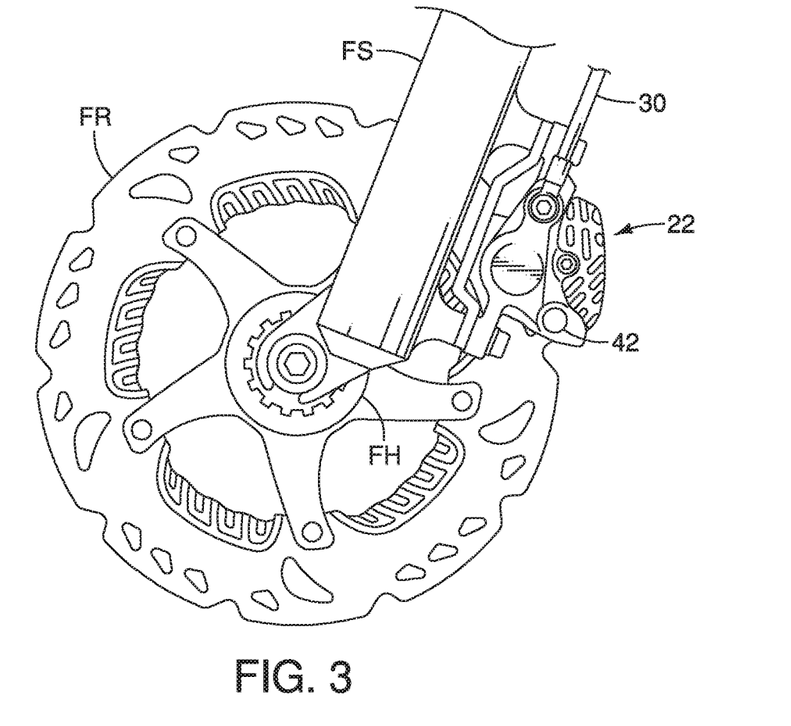
FIG. 3 is a side elevational view of a front portion of the human-powered vehicle (e.g., a bicycle) illustrated in FIG. 1 that has a front disc brake rotor and a front disc brake caliper that selectively grips the front disc brake rotor.
Figure 4:
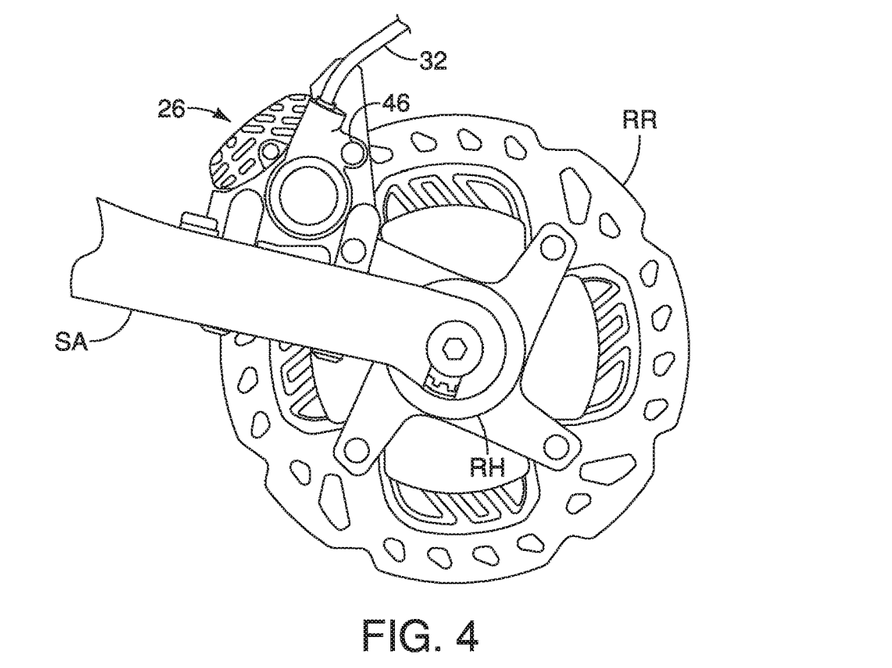
FIG. 4 is a side elevational view of a rear portion of the human-powered vehicle (e.g., a bicycle) illustrated in FIG. 1 that has a rear disc brake rotor and a rear disc brake caliper that selectively grips the rear disc brake rotor.

As seen in FIGS. 2 to 4, the human-powered vehicle 1 further includes a braking system for slowing or stopping one or both of the front and rear wheels FW and RW. As seen in FIG. 3, the front wheel FW is provided with a front disc rotor FR that is fixed to a front hub FH of the front wheel FW. As seen in FIG. 4, the rear wheel RW is provided with a rear disc rotor RR that is fixed to a rear hub RH of the rear wheel RW. Typically, the braking system includes a brake operating device and a braking device. To apply a braking force to the front wheel FW, the brake operating device includes a front brake operating device 20, and the braking device includes a front braking device 22 configured to be operated by the front brake operating device 20. To apply a braking force to the rear wheel RW, the brake operating device includes a rear brake operating device 24, and the braking device includes a rear braking device 26 configured to be operated by the rear brake operating device 24. Here in the illustrated embodiment, the braking system includes the front brake operating device 20, the front braking device 22, the rear brake operating device 24 and the rear braking device 26.

Here, as seen in FIG. 2, the front brake operating device 20 includes a handlebar mounting portion 20a and a brake lever 20b that is pivotally mounted to the handlebar mounting portion 20a. Similarly, as seen in FIG. 2, the rear brake operating device 24 includes a handlebar mounting portion 24a and a brake lever 24b that is pivotally mounted to the handlebar mounting portion 20a. Here, the front brake operating device 20 is a hydraulic brake operating device that is fluidly connected to the front braking device 22 by a first hydraulic hose 30. Similarly, the rear brake operating device 24 is a hydraulic brake operating device that is fluidly connected to the rear braking device 22 by a second hydraulic hose 32. The front braking device 22 and the rear braking device 22 are hydraulic disc brake calipers that have one or more pistons that move a pair of brake pads into contact with the front disc rotor FR or the rear disc rotor RR.

Alternatively, the braking system can be a mechanical disc braking system instead of a hydraulic disc braking system as shown. Since the front brake operating device 20, the front braking device 22, the rear brake operating device 24 and the rear braking device 26 are conventional components that are well known, they will not be described and/or illustrated in detail herein.

As mentioned above, the suspension control device 12 comprises a sensor that is configured to detect an actuation of a braking system of the human-powered vehicle 1. In other words, the sensor is configured to detect an information relating to at least one of an actuation of the brake operating device or an actuation of the braking device as the actuation of the braking system.

In the case of the front braking system (e.g., the front brake operating device 20 and the front braking device 22), the sensor is mounted at least one of the brake operating device 20 or the braking device 22. Similarly, in the case of the rear braking system (e.g., the rear brake operating device 24 and the front braking device 26), the sensor is mounted at least one of the brake operating device 24 or the braking device 26. For both the front braking system and the rear braking system, the sensor is configured to detect an information relating to at least one of an actuation of the brake operating device or an actuation of the braking device as the actuation of the braking system. Accordingly, while preferably, each of the front and rear braking systems include at least one the sensor that detects information indicative of the actuation of the braking system, it will be apparent from this disclosure that certain benefits can be attained without only one sensor that detects the actuation of one of the braking system. In the case of the front braking system, the information relates to at least one of an actuation of the front brake operating device 20 or an actuation of the front braking device 22. In the case of the rear braking system, the information relates to at least one of an actuation of the rear brake operating device 24 or an actuation of the rear braking device 26.

In the illustrated embodiment, as seen in FIG. 2, a front brake operating device sensor 40 is provided on the front brake operating device 20 to detect movement of the brake lever 20b relative to the handlebar mounting portion 20a as information indicative of the actuation of the front braking system. In other words, in the case of the front brake operating device sensor 40, the information relates to the actuation of the front brake operating device 20. Preferably, the front brake operating device sensor 40 is configured to detect an amount of movement (e.g., degrees or millimeters) of the brake lever 20b of the front brake operating device 20, and a detection signal is outputted by the front brake operating device sensor 40 to indicate the amount of movement of the brake lever 20b of the front brake operating device 20.

As seen in FIG. 3, a front braking device sensor 42 is provided on the front braking device 22 to detect movement of a piston relative to a caliper housing as information indicative of the actuation of the front braking system. In other words, in the case of the front braking device sensor 42, the information relates to the actuation of the front braking device 22. Preferably, the front braking device sensor 42 is configured to detect an amount of movement (e.g., millimeters) of a piston of the front braking device 22, and a detection signal (information) is outputted by the front braking device sensor 42 to indicate the amount of movement of the piston of the front braking device 22. The electronic controller 16 is configured to control the front suspension FS in accordance with the information.

Similarly, as seen in FIG. 2, a rear brake operating device sensor 44 is provided on the rear brake operating device 24 to detect movement of the brake lever 24b relative to the handlebar mounting portion 24a as information indicative of the actuation of the rear braking system. In other words, in the case of the rear brake operating device sensor 44, the information relates to the actuation of the rear brake operating device 24. Preferably, the rear brake operating device sensor 44 is configured to detect an amount of movement (e.g., degrees or millimeters) of the brake lever 24b of the rear brake operating device 24, and a detection signal is outputted by the rear brake operating device sensor 44 to indicate the amount of movement of the brake lever 24b of the rear brake operating device 24. The electronic controller 16 is configured to control the front suspension FS and the rear suspension RS in accordance with the information relating to the actuation of the rear brake operating device 24.

As seen in FIG. 4, a rear braking device sensor 46 is provided on the rear braking device 26 to detect movement of a piston relative to a caliper housing as information indicative of the actuation of the rear braking system. In other words, in the case of the rear braking device sensor 46, the information relates to the actuation of the rear braking device 26. Preferably, the rear braking device sensor 46 is configured to detect an amount of movement (e.g., millimeters) of a piston of the rear braking device 26, and a detection signal is outputted by the rear braking device sensor 46 to indicate the amount of movement of the piston of the rear braking device 26. The electronic controller 16 is configured to control the front suspension FS and rear suspension RS in accordance with the information relating to the actuation of the rear braking device 26.

Each of the sensors 40, 42, 44 and 46 constitute one example of a sensor that is configured to detect an actuation of a braking system of the human-powered vehicle 1. The electronic controller 16 is configured to control the suspension (the front suspension FS and/or the rear suspension RS) of the human-powered vehicle 1 in accordance with the actuation detected by the sensor (one or more of the sensors 40, 42, 44 and 46). Each of the sensors 40, 42, 44 and 46 can include a wireless transmitter to communicate with the electronic controller 16, or can be each be connected to the electronic controller 16 by a wire for wired communication. In the case of wireless communications, the wireless communication signals can be radio frequency (RF) signals, ultra-wide band communication signals, or Bluetooth communications or any other type of signal suitable for wireless communications as understood in the bicycle field.

Figure 5:
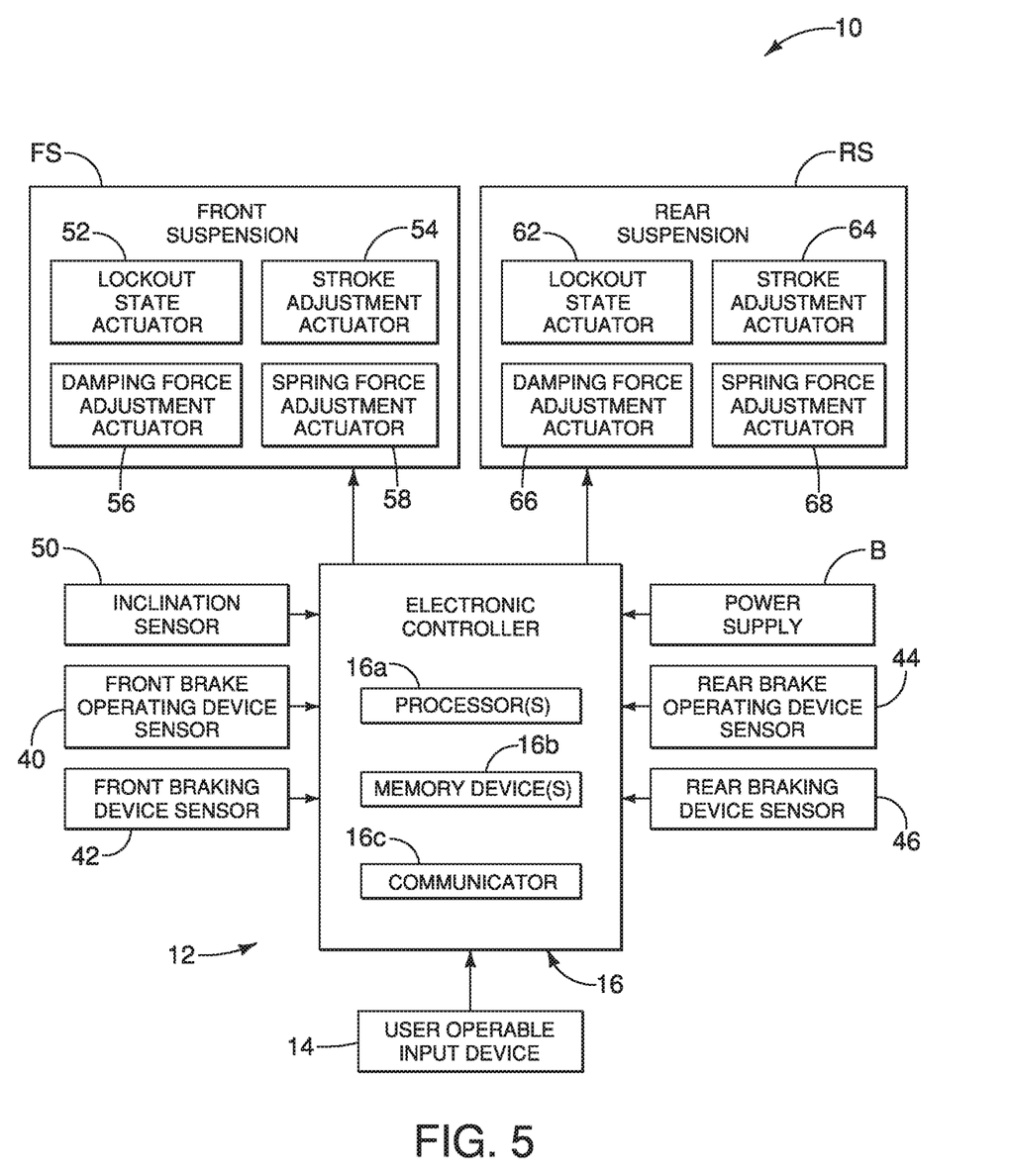
FIG. 5 is a block diagram illustrating a human-powered vehicle (e.g., bicycle) suspension assembly including the suspension control device and the front and rear suspensions of the human-powered vehicle illustrated in FIG. 1.

To better control the stability of the human-powered vehicle 1, as seen in FIGS. 1 and 5, the suspension control device 12 further comprises an additional sensor 50 that is configured to detect an additional information that relates to traveling inclination of the human-powered vehicle 1. Using the additional sensor 50, the electronic controller 16 can determine whether the traveling inclination of the human-powered vehicle 1 is in a nose dive state, a downhill traveling state or an uphill traveling state. Here, for example, the additional sensor 50 is an inclination sensor 14 that is provided on the human-powered vehicle 1 such as on the main frame F as seen in FIG. 1. The term "inclination sensor" as used herein is a device that can measure a tilt or inclination of a bicycle in a fore to aft direction of the human-powered vehicle 1. For example, the additional sensor 50 can be an accelerometer, an inclinometer, a tiltmeter, etc. The additional sensor 50 can include a wireless transmitter to communicate with the electronic controller 16, or can be connected to the electronic controller 16 by a wire for wired communication. In the case of wireless communications, the wireless communication signals can be radio frequency (RF) signals, ultra-wide band communication signals, or Bluetooth communications or any other type of signal suitable for wireless communications as understood in the bicycle field.

With the suspension control device 12 including the additional sensor 50, the electronic controller 16 receives detection signals as the information indicative of the actuation of the braking system from one or more of the sensors 40, 42, 44 and 46, and receives detection signals as the additional information indicative of the traveling inclination from the additional sensor 50. In this way, the electronic controller 16 is configured to control the suspension (the front suspension FS and/or the rear suspension RS) in accordance to the information and the additional information.

As seen in FIG. 1, the front suspension FS is part of the front fork of the human-powered vehicle 1. Thus, the front suspension FS rotatably supports the front wheel FW. As seen in FIG. 5, the front suspension FS preferably includes a lockout state actuator 52, a stroke adjustment actuator 54, a damping force adjustment actuator 56 and a spring force adjustment actuator 58. The each of the actuators 52, 54, 56 and 58 are controlled by the electronic controller 16 either directly or via the user operable input device(s) 14. Preferably, each of the actuators 52, 54, 56 and 58 are electrically controlled actuators that include an electric motor or an electric solenoid that is either located on the front suspension FS or remotely located. In this way, the electronic controller 16 can control the actuators 52, 54, 56 and 58 to adjust the front suspension FS based on actuation of a braking system and/or the traveling state of the human-powered vehicle 1. While the front suspension FS is configured such that a lockout state, a stroke, a damping force and a spring force are all adjustable, it will be apparent from this disclosure that the front suspension FS can be configured so that one or more of these adjustments are omitted.

Basic structure of the front suspension FS is conventional and well known in the bicycle field. Preferably, the front suspension FS includes a stroke adjustment unit, a lockout unit and a damper adjustment unit such as the ones disclosed in U.S. Pat. No. 8,251,376 (assigned to Shimano Inc.). In addition, the adjustable air spring of the front suspension disclosed in U.S. Pat. No. 8,251,376 can be provided with a compression spring and a spring force adjustment unit for adjusting a spring force of the compression spring.

As seen in FIG. 1, the rear suspension RS is mounted is provided between the main frame F and the swing arm SA. Thus, the rear suspension RS movably supports the swing arm SA with respect to the main frame F so that the rear wheel RW can also move with respect to the main frame F. As seen in FIG. 5, the rear suspension RS preferably includes a lockout state actuator 62, a stroke adjustment actuator 64, a damping force adjustment actuator 66 and a spring force adjustment actuator 68. The each of the actuators 62, 64, 66 and 68 are controlled by the electronic controller 16 either directly or via the user operable input device(s) 14. Preferably, each of the actuators 62, 64, 66 and 68 are electrically controlled actuators that include an electric motor or an electric solenoid that is either located on the rear suspension RS or remotely located. In this way, the electronic controller 16 can control the actuators 62, 64, 66 and 68 to adjust the rear suspension RS based on actuation of a braking system and/or the traveling state of the human-powered vehicle 1. Basic structure of the rear suspension RS is conventional and well known in the bicycle field. The suspension adjustments of U.S. Pat. No. 8,251,376 can be adapted to the rear suspension RS such that the rear suspension RS includes a stroke adjustment unit, a lockout unit and a damper adjustment unit. Also, the rear suspension RS can include one or more of the suspension adjustments disclosed in U.S. Patent Application Publication No. 2011/0202236. While the rear suspension RS is configured such that a lockout state, a stroke, a damping force and a spring force are all adjustable, it will be apparent from this disclosure that the rear suspension RS can be configured so that one or more of these adjustments are omitted.

Figure 6:
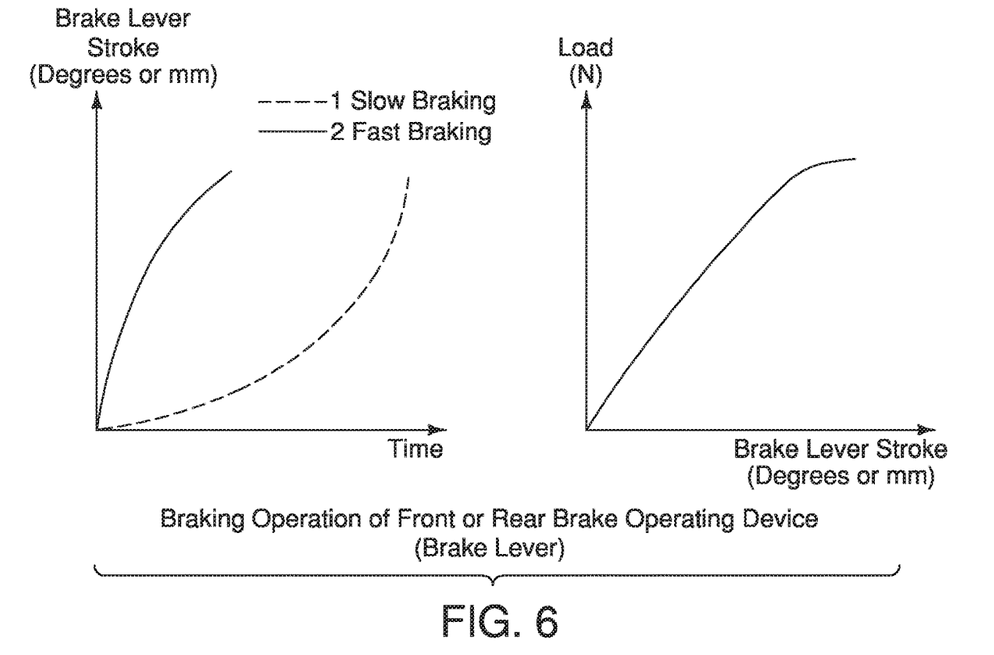
FIG. 6 is a pair of graphs illustrating the relationships of a brake lever stroke versus time and load for a braking operation of either the front or rear brake lever (brake operating device) of the human-powered vehicle illustrated in FIG. 1.
Figure 7:
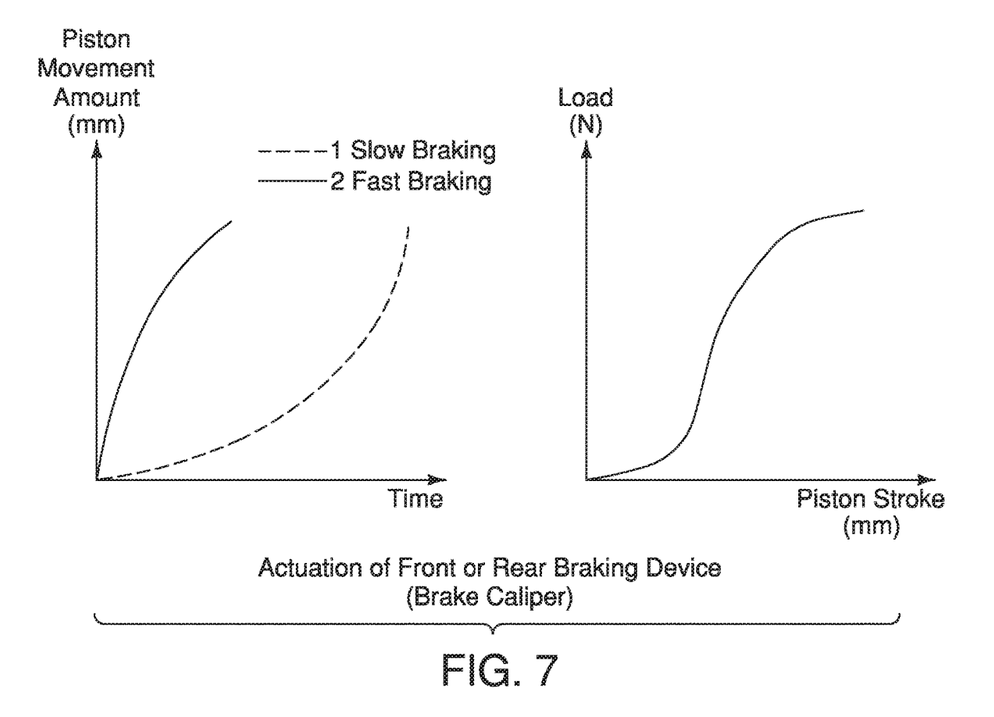
FIG. 7 is a pair of graphs illustrating the relationships of a piston movement versus time and load for actuation of either the front or rear disc brake caliper (braking device) of the human-powered vehicle illustrated in FIG. 1.

Turning now to FIGS. 6 and 7, a braking operation of the human-powered vehicle 1 will not be discussed. As seen in FIG. 6, when a rider operates one of the brake levers 20b and 24b of one of the front and rear brake operating devices 20 and 24, the load to operate the brake lever 20b or 24b increases relatively linearly with the load increasing until the end of the brake lever stroke. As seen in FIG. 7, in response to the operation one of the brake levers 20b and 24b, one of the front and rear braking devices 24 and 26 is actuated. As one of the front and rear braking devices 24 and 26 is actuated, its piston(s) is moved into engagement with a corresponding one of the brake disc rotors FR and RR. Initially, during the braking operation, the braking force gradually increases as the piston(s) engages the brake disc rotor FR or RR. Then, partially into the braking operation, the braking force begins to increase more rapidly with a smaller amount of movement of the piston(s). Finally, towards the end of the braking operation, the braking force begins to decrease with respect to the amount of movement of the piston(s). Depending on whether the brake lever 20b or 24b is operated slowly or fast, the piston(s) will move either at a slow or fast rate. Thus, hard or fast braking of the front braking device 24 will cause the front end of the human-powered vehicle 1 to nose dive due to the compression of the front suspension FS. On the other hand, with soft or slow braking, the braking force applied to the front brake disc rotor FR by the front braking device 24 is more gradual and will not have as great of an effect on the compression of the front suspension FS.

Figure 8:
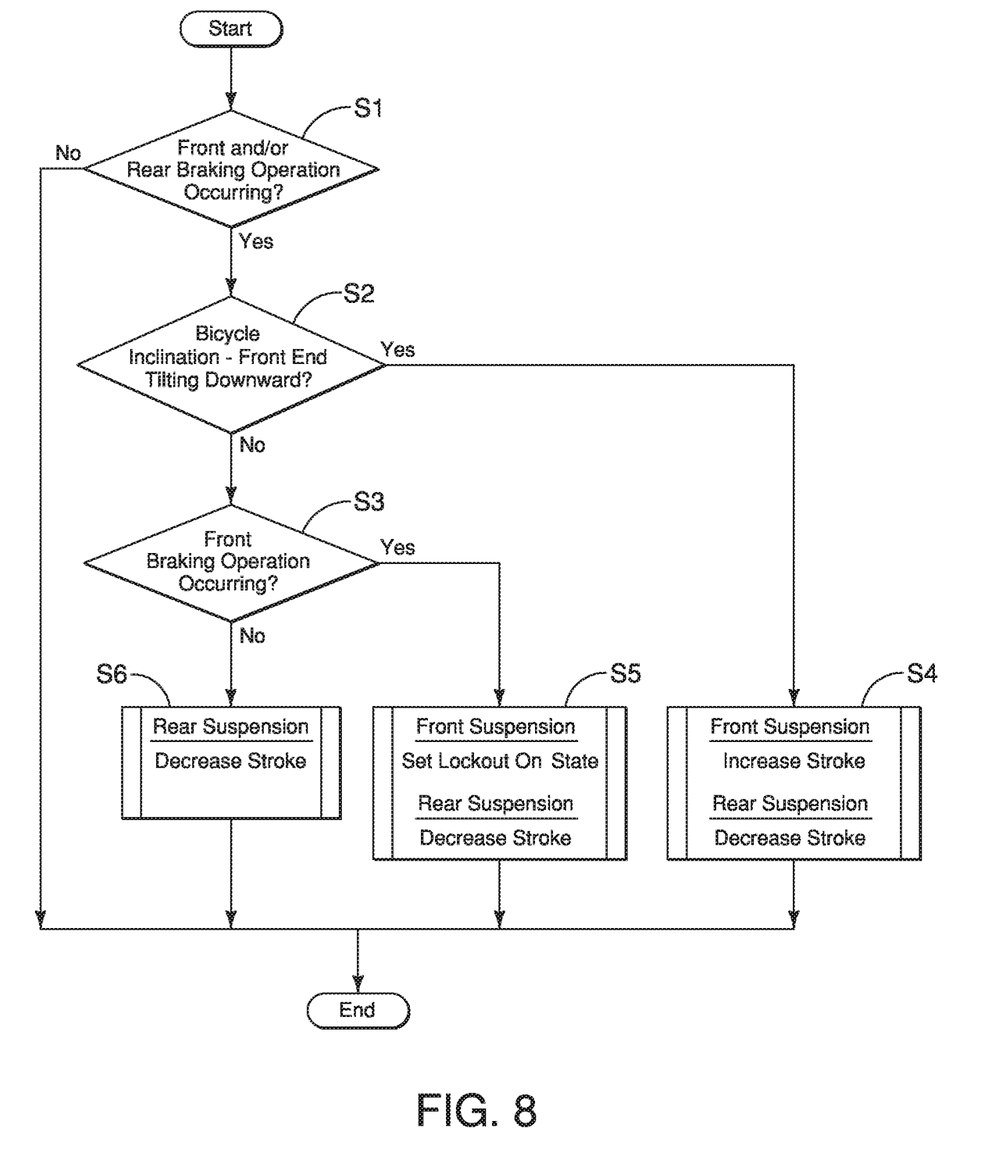
FIG. 8 is a flowchart of an automatic suspension control executed by the electronic controller of the suspension control device for automatically changing a state (e.g., at least one of a damping force, a spring force, a lockout state or a stroke of the suspension) of the front and rear suspensions in accordance with information (detection results) of at least one sensor that is configured to detect information relating to an actuation of a braking system of the human-powered vehicle illustrated in FIG. 1.

Turning now to FIG. 8, one suspension control that is executed by the electronic controller 16 will now be discussed. Here, the electronic controller 16 is configured to control the front suspension FS and/or the rear suspension RS in accordance with the information related to actuation of a braking system from one or more of the sensors 40, 42, 44 and 46 and the additional information related the traveling inclination from the additional sensor 50. This suspension control process is periodically executed by the electronic controller 16 every so often (e.g., one or two milliseconds). Alternatively, suspension control process can be set such that the suspension control process is executed in a predetermined time period or within an operation time lag or interval. In this suspension control, the electronic controller 16 controls at least one of a damping force, a spring force, a lockout state or a stroke of the front and rear suspensions FS and/or RS. The lockout state that includes a lockout ON state and a lockout OFF state.

In step S1, the electronic controller 16 determines if a braking operation is occurring (i.e., a front and/or rear braking operation). Here, the electronic controller 16 receives detections signals from one or more of the sensors 40, 42, 44 and 46 to obtain the information related to actuation of both of the front and rear braking systems. In this suspension control, one of the sensors 40 and 42 can be omitted if needed and/or desired. Also, in this suspension control, one of the sensors 44 and 46 can be omitted if needed and/or desired. If the electronic controller 16 determines a braking operation is occurring (i.e., a front and/or rear braking operation), then the control process proceeds to step S2. If the electronic controller 16 determines that neither a front braking operation nor a rear braking operation is occurring, then the control process ends.

In step S2, the electronic controller 16 determines if the traveling inclination of the human-powered vehicle 1 is such that the front end is tilting downward indicating either a nose dive state or a downhill traveling state based on the additional information of the additional sensor 50. If the electronic controller 16 determines that the front end is not tilting downward, then the control process proceeds to step S3. If the electronic controller 16 determines that the front end is tilting downward, then the control process proceeds to step S4.

In step S3, the electronic controller 16 determines if a front braking operation is occurring based on the information of the front brake operating device sensor 40 and/or the front braking device sensor 42. If the electronic controller 16 determines that a front braking operation is occurring, then the control process proceeds to step S5. If the electronic controller 16 determines that a front braking operation is not occurring, then the control process proceeds to step S6.

Figure 9:
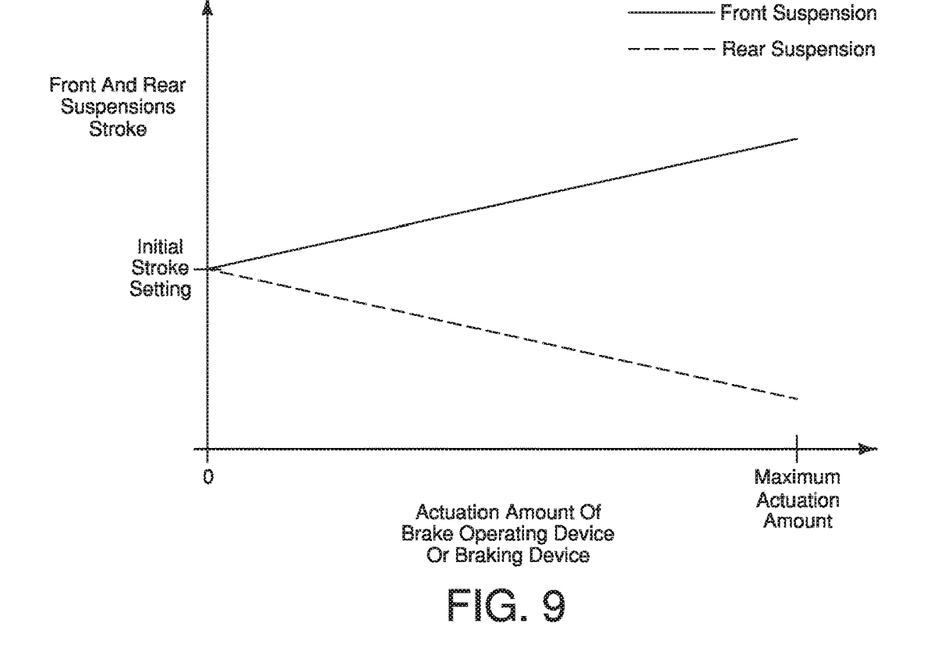
FIG. 9 is a prestored control map that is used by the electronic controller to control an operating state (e.g., the stroke) of the front and rear suspensions of the human-powered vehicle illustrated in FIG. 1 based on an actuation amount of at least one of the rear brake operating device or the rear braking device.

In step S4, the electronic controller 16 is configured to control at least one of a damping force, a spring force, a lockout state or a stroke of the front and rear suspensions FS and RS in accordance with the information related to actuation of a braking system from one or more of the sensors 40, 42, 44 and 46, and the additional information related the traveling inclination from the additional sensor 50. Preferably, in step S4, the electronic controller 16 is configured to increase the stroke of the front suspension FS and to decrease a stroke of the rear suspension RS in accordance with the information. In particular, since a braking operation is occurring (i.e., a front and/or rear braking operation) as determined in step S1 and the front end is tilting downward as determined in step S2, the electronic controller 16 outputs a control signal to the stroke adjustment actuator 54 to increase the stroke of the front suspension FS, and outputs a control signal to the stroke adjustment actuator 64 to decrease a stroke of the rear suspension RS. As seen in FIG. 9 in step S4, preferably, the electronic controller 16 is configured to adjust a control amount of the suspension (the front suspension FS and/or the rear suspension RS) in accordance with at least one of an actuation amount of the brake operating device (the front brake operating device 20 and the rear brake operating device 24) or an actuation amount of the braking device (the front braking device 22 and/or the rear braking device 26). While the control map of FIG. 9 illustrates a linear relationship between the stroke and the actuation amount of the brake operating device or the braking device, the relationship between the stroke and the actuation amount of the brake operating device or the braking device does not need to be linear.

Alternatively, the electronic controller 16 can be set by a user such that, in step S4, one or more operational characteristics of the front suspension FS is adjusted using one or more of the actuators 52, 54, 56 and 58 and one or more operational characteristics of the rear suspension RS is adjusted using one or more of the actuators 62, 64, 66 and 68. For example, in step S4, the electronic controller 16 can be programmed to adjust the front suspension FS to (1) increase the stroke, (2) decrease the damping force, (3)

decrease a spring force, (4) and/or set a predetermined (original or default) position, and adjust the rear suspension RS to (1) decrease the stroke, (2) increase the damping force, (3) increase a spring force, (4) and/or set a predetermined (original or default) position. Also, alternatively, the electronic controller 16 can be set by a user such that, in step S4, the electronic controller 16 can be programmed to set the rear suspension RS to the lockout ON state.

Figure 10:
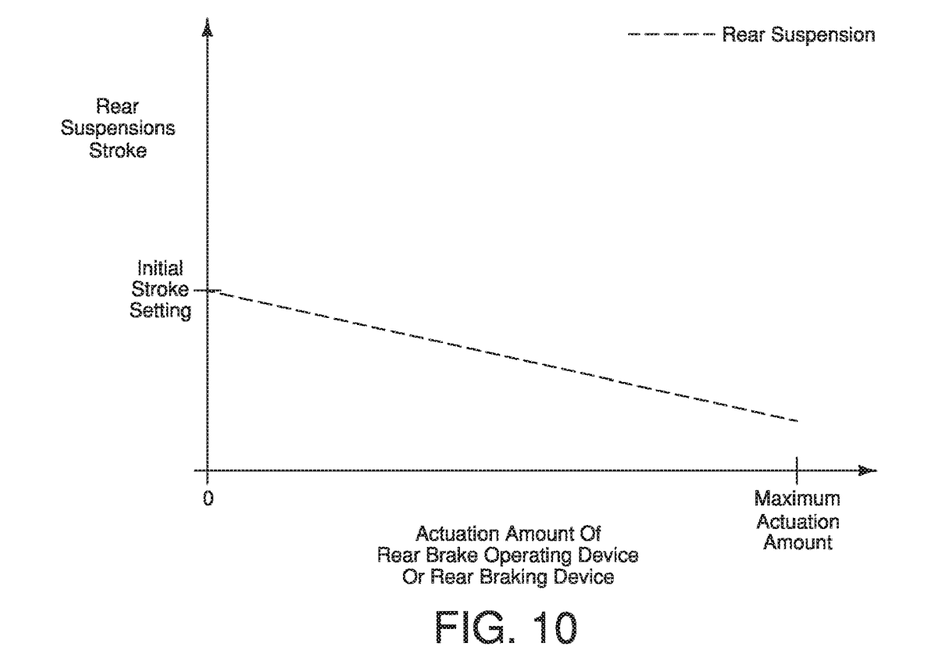
FIG. 10 is a prestored control map that is used by the electronic controller to control an operating state (e.g., the stroke) of the rear suspension of the human-powered vehicle illustrated in FIG. 1 based on an actuation amount of at least one of the rear brake operating device or the rear braking device.

In step S5, the electronic controller 16 is configured to control at least one of a damping force, a spring force, a lockout state or a stroke of the front and rear suspensions FS and RS in accordance with the information related to actuation of a braking system from one or more of the sensors 40, 42, 44 and 46. Preferably, in step S5, the electronic controller 16 is configured to set the front suspension FS into the lockout ON state in accordance with the information. Also, preferably, in step S5, the electronic controller 16 is configured to decrease a stroke of the rear suspension RS in accordance with the information. In particular, since at least a front braking operation is occurring as determined in step S3 and the front end is not tilting downward as determined in step S2, the electronic controller 16 outputs a control signal to the stroke adjustment actuator 52 to set the front suspension FS into the lockout ON state, and outputs a control signal to the stroke adjustment actuator 64 to decrease a stroke of the rear suspension RS. As seen in FIG. 10, preferably in step S5, the electronic controller 16 is configured to adjust a control amount of the suspension (the rear suspension RS) in accordance with at least one of an actuation amount of the brake operating device (the rear brake operating device 24) or an actuation amount of the braking device (the rear braking device 26). While the control map of FIG. 10 illustrates a linear relationship between the stroke and the actuation amount of the brake operating device or the braking device, the relationship between the stroke and the actuation amount of the brake operating device or the braking device does not need to be linear.

Alternatively, the electronic controller 16 can be set by a user such that, in step S5, one or more operational characteristics of the front suspension FS is adjusted using one or more of the actuators 52, 54, 56 and 58 and one or more operational characteristics of the rear suspension RS is adjusted using one or more of the actuators 62, 64, 66 and 68. For example, in step S5, instead of setting the front suspension FS to the lockout ON state, the electronic controller 16 can be programmed to adjust the front suspension FS to (1) decrease the stroke, (2) increase the damping force, (3) increase a spring force, and/or (4) set a predetermined (original or default) position, and adjust the rear suspension RS to (1) decrease the stroke, (2) increase the damping force, (3) increase a spring force, and/or (4) set a predetermined (original or default) position. Also, alternatively, the electronic controller 16 can be set by a user such that, in step S5, the electronic controller 16 can be programmed to set the rear suspension RS to the lockout ON state.

In step S6, the electronic controller 16 is configured to control at least one of a damping force, a spring force, a lockout state or a stroke of the rear suspension RS in accordance with the information related to actuation of a braking system from one or more of the sensors 40, 42, 44 and 46. In other words, in step S6, the electronic controller 16 is configured to control the rear suspension RS in accordance with the information. Preferably, in step S6, the electronic controller 16 is configured to decrease a stroke of the rear suspension RS in accordance with the information relating to the actuation. In particular, since only a rear braking operation is occurring as determined in step S3 and the front end is not tilting downward as determined in step S2, the electronic controller 16 outputs a control signal to the stroke adjustment actuator 64 to decrease a stroke of the rear suspension RS. Similar to the control of step S5, preferably in step S6, the electronic controller 16 is configured to adjust a control amount of the suspension (the rear suspension RS) in accordance with at least one of an actuation amount of the brake operating device (the rear brake operating device 24) or an actuation amount of the braking device (the rear braking device 26) as seen in FIG. 10.

Alternatively, the electronic controller 16 can be set by a user such that, in step S6, one or more operational characteristics of the rear suspension RS is adjusted using one or more of the actuators 62, 64, 66 and 68. For example, in step S6, the electronic controller 16 can be programmed to adjust the rear suspension RS to (1) decrease the stroke, (2) increase the damping force, increase a spring force and/or set a predetermined (original or default) position. Also, alternatively, the electronic controller 16 can be set by a user such that, in step S6, the electronic controller 16 can be programmed to set the rear suspension RS to the lockout ON state.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the suspension control device. Accordingly, these directional terms, as utilized to describe the suspension control device should be interpreted relative to a bicycle in an upright riding position on a horizontal surface and that is equipped with the suspension control device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A suspension control device for a human-powered vehicle, the suspension control device comprising:
    a sensor configured to detect an actuation of a braking system of the human-powered vehicle, the braking system including a brake operating device and a braking, device, the sensor being configured to detect an amount of change of at least one of the brake operating device and the braking device indicating the actuation of the braking system; and
    an electronic controller configured to control a suspension of the human-powered vehicle in accordance with the actuation detected by the sensor.

2. The suspension control device according to claim 1, wherein
    the electronic controller is configured to control at least one of a damping force, a spring force, a lockout state or a stroke of the suspension.

3. The suspension control device according to claim 1, wherein
    the amount of change of the brake operating device includes an amount of movement of a brake lever of the brake operating device, and the amount of change of the braking device includes an amount of movement of a piston of the braking device.

4. The suspension control device according to claim 1, wherein
    the brake operating device includes a front brake operating device,
    the braking device includes a front braking device configured to be operated by the front brake operating device, and
    the amount of change relates to at least one of an actuation of the front brake operating device or an actuation of the front braking device.

5. The suspension control device according to claim 4, wherein
    the suspension includes a front suspension,
    the amount of change relates to the actuation of the front brake operating device, and
    the electronic controller is configured to control the front suspension in accordance with the amount of change.

6. The suspension control device according to claim 4, wherein
    the suspension includes a front suspension,
    the amount of change relates to the actuation of the front braking device, and
    the electronic controller is configured to control the front suspension in accordance with the amount of change.

7. The suspension control device according to claim 5, wherein
    the lockout state includes a lockout ON state and a lockout OFF state, and
    the electronic controller is configured to set the front suspension into the lockout ON state in accordance with the amount of change.

8. The suspension control device according to claim 4, wherein
    the suspension includes a rear suspension,
    the amount of change relates to the actuation of the front brake operating device, and
    the electronic controller is configured to control the rear suspension in accordance with the amount of change.

9. The suspension control device according to claim 4, wherein
    the suspension includes a rear suspension,
    the amount of change relates to the actuation of the front braking device, and
    the electronic controller is configured to control the rear suspension in accordance with the amount of change.

10. The suspension control device according to claim 8, wherein
    the electronic controller is configured to decrease a stroke of the rear suspension in accordance with the amount of change relating to the actuation.

11. The suspension control device according to claim 1, wherein
    the brake operating device includes a rear brake operating device,
    the braking device includes a rear braking device configured to be operated by the rear brake operating device, and
    the amount of change relates to at least one of an actuation of the rear brake operating device or an actuation of the rear braking device.

12. The suspension control device according to claim 11, wherein
    the suspension includes a front suspension and a rear suspension,
    the amount of change relates to the actuation of the rear brake operating device, and
    the electronic controller is configured to control the front suspension and the rear suspension in accordance with the amount of change relating to the actuation of the rear brake operating device.

13. The suspension control device according to claim 11, wherein
    the suspension at least includes a front suspension and a rear suspension, the amount of change relates to the actuation of the rear braking device, and the electronic controller is configured to control the front suspension and rear suspension in accordance with the amount of change relating to the actuation of the rear braking device.

14. The suspension control device according to claim 12, wherein the electronic controller is configured to increase the stroke of the front suspension and to decrease a stroke of the rear suspension in accordance with the amount of change.

15. The suspension control device according to claim 1, wherein the electronic controller is configured to adjust a control amount of the suspension in accordance with at least one of the amount of movement of the brake operating device or the amount of movement of the braking device.

16. The suspension control device according to claim 1, further comprising an additional sensor configured to detect an information that relates to traveling inclination of the human-powered vehicle, and the electronic controller is configured to control the suspension in accordance to the amount of change and the information.

17. The suspension control device according to claim 1, wherein the sensor is mounted at least one of the brake operating device or the braking device.

* * * * *